Sept. 3, 1957 C. D. KEITH 2,805,260
PRODUCTION OF ALCOHOLS AND ETHERS
Filed June 10, 1955
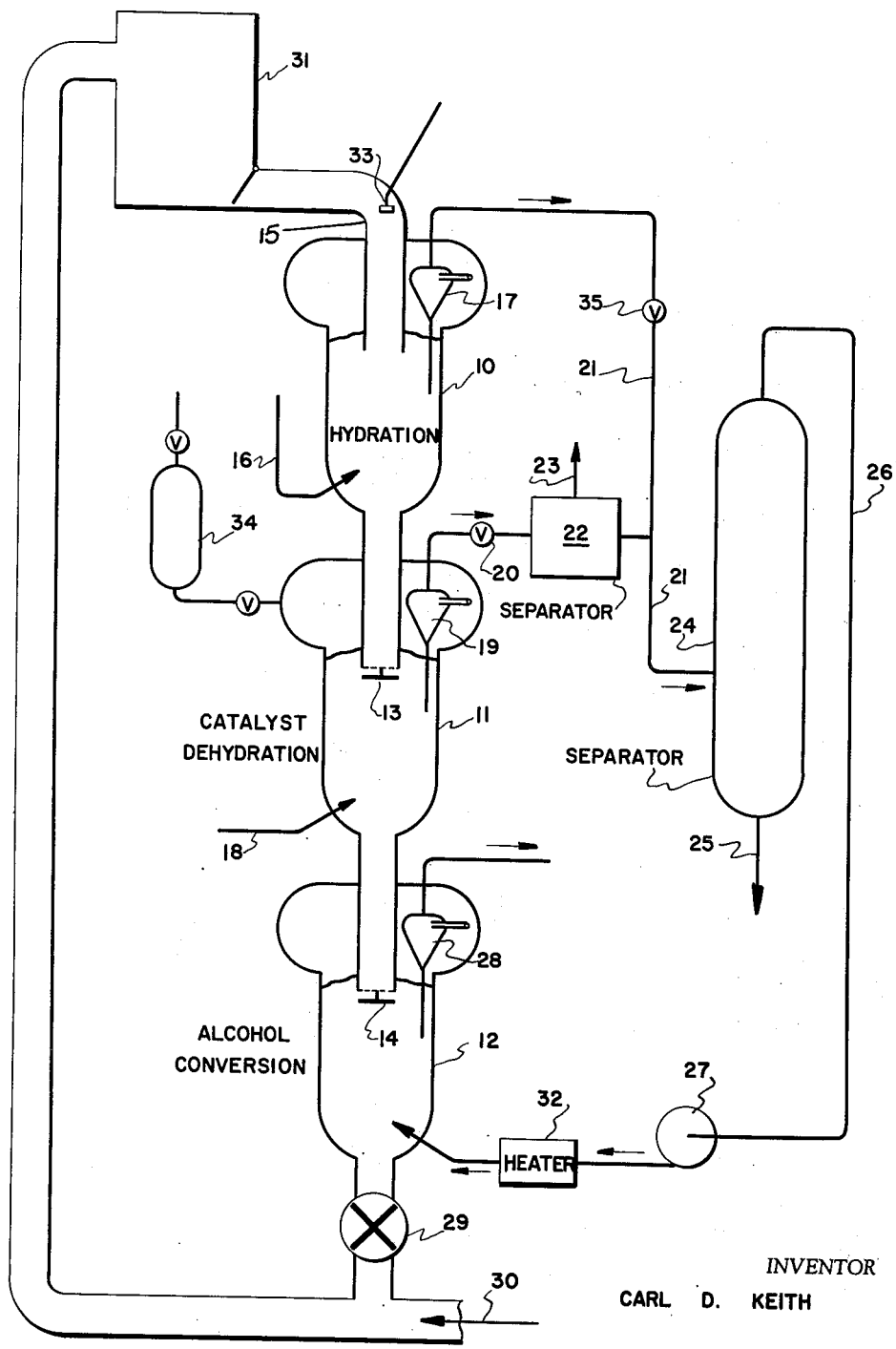
INVENTOR
CARL D. KEITH
BY *Adams Forward & McLean*
ATTORNEY

United States Patent Office 2,805,260
Patented Sept. 3, 1957

---

2,805,260
PRODUCTION OF ALHOHOLS AND ETHERS

Carl D. Keith, Munster, Ind., assignor to Sinclair Refining Company, New York, N. Y., a corporation of Maine Application June 10, 1955, Serial No. 514,736

2 Claims. (Cl. 260—614)

This invention relates to the production of ether and ether-alcohol mixture through hydration of a mono-olefin containing 2 to 4 carbon atoms with subsequent conversion of the intermediate product to produce a final ether-rich product. More particularly, the present invention provides a reaction system for conducting these hydration and alcohol conversion reactions in which a solid catalyst flows downwardly through three separate zones in which, respectively, the olefin is hydrated, the catalyst is dehydrated, and the ether content of the effluent from the catalyst dehydration zone is increased by alcohol conversion.

It is known that low molecular weight mono-olefins can be converted to the corresponding alcohols and ethers by contact with water in the presence of various catalytic materials. The reaction products, which may contain predominantly alcohol or ether and usually at least a small proportion of each as well as various amounts of olefin polymer, are particularly useful as gasoline blending agents to obtain fuels of higher octane rating. In this reaction olefins are hydrated in part to alcohols which may in turn at least in part be converted to ethers but over all it can be considered that this is a hydration reaction. It is also known that low molecular weight alcohols can be dehydrated to obtain ethers. The water released in this reaction can combine with olefin if present to form alcohols. Should olefin be present in the latter reaction it could also form ether by condensation with alcohol. As an over-all process the olefin feeds are hydrated by contact with water and the catalytic material to the mixture of ether and alcohols, and after separation of any excess water the amount of ether in this product is increased by conversion over similar type catalysts.

Common sources of olefin feed for these reactions are the relatively pure olefins and mixed materials such as the petroleum refinery streams containing propylene and butylenes, both normal and isobutylene, and a substantial amount of $C_3$ or $C_4$ paraffins. A particular stream which can be employed contains from about 50 to 75 volume percent of propylene with the remaining being substantially propane. In the hydration and alcohol conversion reactions, various solid catalysts are known to be effective and can be disposed in a fixed bed or employed in slurry form either on a batch or a continuous basis. In this reaction the water and olefin can be present as liquids or vapors depending upon the particular reaction conditions employed. A principal utility for the products of olefin hydration or alcohol conversion is as a gasoline blending component.

In the present invention these hydration and alcohol conversion reactions are conducted in a manner which improves reactant and catalyst contact through the use of catalyst passing downwardly in countercurrent relationship to reactant flow. In this system three separate catalyst zones are provided in which the separate reactions of olefin hydration, catalyst dehydration and alcohol conversions are effected under conditions which allow for correlating reaction conditions and the hydrated state of the catalyst with intimate reactant-to-catalyst contact to obtain a product of increased ether content.

The present invention will be described with reference to the drawing which diagrammatically illustrates the present process employing the three separate catalyst zones.

Referring to the drawing, the overall conversion system includes the olefin hydration reactor 10, the catalyst dehydration reactor 11 and the alcohol conversion reactor 12. As illustrated, the olefin hydration reaction zone is situated above the catalyst dehydration zone and between these zones is located the vapor seal 13. The catalyst dehydrator is situated above the alcohol conversion zone and separated therefrom by vapor seal 14. Thus the three zones are vertically spaced and catalyst can pass from the hydration zone by gravity through vapor seal 13 to the catalyst dehydration zone and then to the alcohol conversion zone through vapor seal 14.

Solid catalyst, as tabletted or extruded particles or as finely divided solids, enters the olefin hydration zone 10 by way of line 15 and is added to the downwardly moving bed in that zone. The olefin feed, for instance a $C_3$ refinery stream containing 65% of propylene end 35% of propane, is passed in admixture with water to the catalyst bed of zone 10 through line 16. Effluent product from the olefin hydration zone passes overhead through cyclone 17, and thus countercurrent contact is provided in the hydration between the catalyst and the reactants to convert olefins to predominantly alcohols, usually containing various amounts of ethers. Effluent from reactor 10 passes through catalyst cyclone separator 17 and the pressure reducing valve 35 to line 21.

The catalyst from zone 10 falls by gravity through vapor seal 13 and is added to the downwardly moving bed in zone 11. Hot flue gas or other inert gases is passed by way of line 18 to the lower portion of the catalyst bed in this zone. As the catalyst moves downwardly in this bed the hot flue gas strips water and remaining alcohol and ether from the catalyst particles. The stripped mixture is separated from the upper portion of zone 11 by way of catalyst cyclone separator 19, pressure reducing valve 20 and gas separator 22. The alcohol-containing stream from separator 22 is combined with the alcohol-containing product in line 21. Volatile gases are removed from separator 22 by line 23. The combined product passes by way of line 21 to separator 24 which removes water through line 25. An alcohol azeotrope, some ether, unreacted propylene and propane goes overhead from separator 24 through line 26.

Catalyst passes by gravity from the bottom of the catalyst bed in zone 11 through vapor seal 14 and is added to the downwardly moving catalyst bed maintained in zone 12 for alcohol conversion. The alcohol product, containing ether, unreacted olefin and propane, in line 26 is repressured in pump 27, passed through heater 32 and injected into the lower portion of the catalyst bed of zone 12. Countercurrent contact between the alcohol feed and the catalyst is thus provided, and the effluent product enhanced in ether content and also containing alcohol, olefin, propane and water, is removed from the upper portion of zone 12 through catalyst cyclone separator 28. The solid catalyst from the lower portion of the alcohol conversion zone 12 passes through vapor lock 29 and is lifted by compressed inert gas entering through line 30 to the vapor lock catalyst hopper 31. Catalyst enters line 15 from the hopper 31 and if desired can be contacted with water entering through the spray head 33. Catalyst make-up is from storage hopper 34. When desired, olefin in the ether product can be recycled to the feed zone 10. The feeds to the separate zones can enter around the periphery of the catalyst bed, at different levels in the bed or in another convenient or advantageous manner. When using large particle form catalyst such as extruded or tabletted particles, cyclone separators 17, 19 and 28 need not be provided.

This reaction system is highly advantageous in producing the desired ether-containing product. First, the countercurrent flow employed provides maximum contact between the catalyst and the reactants. This flow also provides a more homogeneous type reactor which more effectively employs the catalyst. Also, the separate reactions can be conducted under more favorable conditions. For instance, the alcohol conversion is best conducted at high temperatures, while in the olefin hydration reaction somewhat lower temperatures are preferred.

The most significant advantage afforded by the present reaction system can be described in terms of catalyst hydration. For instance, the catalyst passing from the dehydrating zone 11 to the bed in zone 12 is substantially dehydrated which is most advantageous in conversion of alcohol to ether in this zone. At the same time, during this reaction water is produced and catalyst exiting from the lower portion of zone 12 is in a hydrated state which is advantageous as this catalyst is then passed into the olefin hydration zone and much of the water needed to satisfy the absorptive characteristics of the catalyst need not be supplied by that introduced with the olefin feed. Thus as the catalyst enters the olefin hydration zone it is in intimate contact with water and in an effective state for olefin hydration. In the system the hydrated catalyst passing from zone 10 is dehydrated in zone 11 and prepared again for cycling through the system by way of the alcohol dehydration zone 12. Further, the hot flue gas supplied to zone 11 for dehydrating the catalyst can serve to preheat the catalyst for the reaction to be effected in zone 12.

Representative conditions which can be employed in the olefin hydration stage include temperatures of 250 to 700° F., pressures of 15 to 1500 p. s. i. g. and space velocities of 0.1 to 5 W. H. S. V. (weight of olefin per weight of catalyst per hour). When using small particle form catalyst, vapor velocities through the bed can generally be from about 0.2 to 0.6 foot per second. The water to olefin molar ratio supplied to this reaction zone may vary from about 0.1 to 6 to 1; however, it will usually be within the range of 0.2 to 2 to 1. The catalyst dehydration zone 11 is maintained at essentially the same pressure as the olefin hydration stage and the temperature of the entering air can be sufficient to preheat the catalyst for the alcohol dehydration reaction, for instance of the order of 300 to 700° F. The temperatures in zone 12 for alcohol conversion will usually vary between about 400 to 550° F. with pressures ranging from 15 to 1500 p. s. i. g. Conditions are selected in the hydration and alcohol conversion zones to provide the reactants in the gas phase.

As a non-limiting example, the catalyst employed in a representative reaction system is 80 to 200 mesh alumina containing 15 weight percent of tungsten oxide. The $C_3$ petroleum refinery stream containing 60 mole percent propylene is mixed with water in the molar ratio of 1 to 1 olefin to water and preheated to maintain a temperature in zone 10 of 450° F. The pressure in zone 10 is 600 p. s. i. g. and the olefin space velocity is 1 W. H. S. V. based on catalyst in zone 10. Gas velocity through the catalyst beds is 0.2 foot per second. In the catalyst dehydration zone air is supplied at 475° F. In the alcohol conversion zone the alcohol feed is preheated to maintain a temperature of 475° F. and the pressure is about 600 p. s. i. g.

The catalysts employed in the reaction system of this invention are of the solid inorganic type. These catalysts include acidic metal oxides of groups IV to VII and their salts particularly of the metals of atomic number from 26 to 30. Also included as inorganic catalysts are the metals and oxides of metals of the iron group transition metals, group I–B, group II–B and the platinum group. Salts of these metals and acidic oxides are also useful. Another inorganic catalyst which is effective is boria and the inorganic complexes known as heteropoly acids are also effective. In the reactions of this invention the respective types of catalyst employed can be deposited on inorganic supports such as silica, alumina, pumice, kieselguhr, diatomaceous earth, clays, etc. When employing a supporting base halogen promoters such as combined fluoride and chloride can be used. Usually when employing a supporting base the active component comprises from 5 to 50 weight percent of the catalyst.

It is claimed:

1. The method of producing an ether-containing product in a system comprising three vertically spaced reaction zones, each having a downwardly flowing bed of inorganic catalyst and providing for catalyst flow by gravity through the beds in the three zones, which comprises passing mono-olefin containing 2 to 4 carbon atoms and water into the lower portion of the upper catalyst bed maintained under olefin hydration conditions, passing catalyst from this upper zone to the next lower zone, contacting the downwardly flowing bed of catalyst in this zone with hot inert gas to dehydrate the catalyst, passing the dehydrated catalyst to the downwardly flowing bed in the next lower zone, introducing into the lower portion of this zone the dewatered effluent product from the uppermost olefin hydration zone, withdrawing catalyst from the lowermost reaction zone, and introducing it into the upper portion of the olefin hydration zone.

2. The method of claim 1 in which the mono-olefin is propylene.

References Cited in the file of this patent
UNITED STATES PATENTS

| | | |
|---|---|---|
| 1,907,317 | Brown et al. | May 2, 1933 |
| 2,084,390 | Dreyfus | June 22, 1937 |
| 2,239,801 | Voorhees | Apr. 29, 1941 |
| 2,387,378 | Wolk | Oct. 23, 1945 |
| 2,694,049 | Reynolds et al. | Nov. 9, 1954 |